United States Patent
Hill et al.

(10) Patent No.: US 7,866,136 B1
(45) Date of Patent: Jan. 11, 2011

(54) BELT PICKUP FOR A DRAPER HEADER

(75) Inventors: Leslie G. Hill, Humboldt (CA); Derek S. Rude, Muenster (CA); Robert Cropper, Humboldt (CA)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/564,629

(22) Filed: Sep. 22, 2009

(51) Int. Cl.
*A01D 43/02* (2006.01)
*A01D 89/00* (2006.01)

(52) U.S. Cl. ....................................................... 56/364

(58) Field of Classification Search ................... 56/364, 56/14.6, 14.8, 14.3, 181, 124
See application file for complete search history.

(56) References Cited

U.S. PATENT DOCUMENTS

| | | | | |
|---|---|---|---|---|
| 1,724,300 A | * | 8/1929 | Moncreiffe | 56/14.8 |
| 1,960,978 A | * | 5/1934 | Redpath et al. | 56/14.5 |
| 2,253,797 A | * | 8/1941 | Melroe | 56/364 |
| 2,305,484 A | | 12/1942 | Merchen | |
| 2,608,041 A | * | 8/1952 | Schoenrock | 56/14.6 |
| 2,979,187 A | * | 4/1961 | Erickson | 198/839 |
| 3,718,197 A | * | 2/1973 | Arnould et al. | 177/16 |
| 4,038,809 A | * | 8/1977 | Arnould et al. | 56/124 |
| 4,261,163 A | * | 4/1981 | Shaw | 56/327.1 |
| 4,412,612 A | | 11/1983 | Ackerman | |
| 4,492,074 A | | 1/1985 | Sund | |
| 4,617,787 A | * | 10/1986 | Eguchi et al. | 56/14.6 |
| 4,627,226 A | | 12/1986 | De Coene | |
| 4,841,718 A | | 6/1989 | Sund | |
| 5,822,959 A | * | 10/1998 | Norton | 56/1 |
| 5,875,622 A | | 3/1999 | Stoll | |
| 6,227,354 B1 | | 5/2001 | Howden et al. | |
| 7,281,365 B2 | | 10/2007 | Zürn | |

FOREIGN PATENT DOCUMENTS

JP 7053029 A 2/1995

* cited by examiner

*Primary Examiner*—Árpád Fábián-Kovács
(74) *Attorney, Agent, or Firm*—Michael G. Harms; Patrick M. Sheldrake

(57) ABSTRACT

A crop gathering device is provided for use with a harvesting header including a frame carrying a belt to deliver a crop to the header, the frame having opposed ends and connected to the header. The frame includes a first support member and a second support member each extending unsupported between the opposed ends of the frame. A driven roller assembly has at least two axially aligned rollers extending between the opposed ends of the frame, regions of the rollers of the driven roller assembly being rotatably secured to the first support member. An idler roller assembly has at least two axially aligned rollers extending between the opposed ends of the frame, regions of the rollers of the idler roller assembly being rotatably secured to the second support member. The roller assemblies move the belt for delivering a crop to the header.

21 Claims, 4 Drawing Sheets

BELT PICKUP FOR A DRAPER HEADER

FIELD OF THE INVENTION

The present invention relates generally to crop gathering devices. It relates more particularly to crop gathering devices for use with harvesting headers.

BACKGROUND OF THE INVENTION

Crop gathering devices for collecting crops arranged in windrows can include a belt positioned along the front of the device. The belt is driven to rotate between opposed pairs of roller assemblies to convey the crops into a header that is secured to an agricultural harvester, such as a combine in which is directed along the windrow. To maintain tracking, or alignment control of the belt with respect to the crop gathering device, only the distance between the respective ends of the roller assemblies is adjustable. The belt is maintained in frictional contact with the roller assemblies by virtue of tension or increasing distance between the ends of the roller assemblies.

In operation, crops are often disproportionately positioned toward the center of the window. Due to the concentration of weight of the crop near the center of the belt, there may be insufficient friction between the belt and the rollers, resulting in "belt slippage." Increasing the distance between the opposed rollers can result in roller deflection, resulting in inconsistent amounts of tension applied to different portions of the belt, and possibly damaging the outer edges of the belt.

SUMMARY OF THE INVENTION

The present invention relates to a crop gathering device for use with a harvesting header including a frame carrying a structure movable about an endless path to deliver a crop to the header, the frame having opposed ends and connected to the header. The frame includes a first support member and a second support member, each support member extending unsupported between the opposed ends of the frame. A driven roller assembly having at least two axially aligned rollers extends between the opposed ends of the frame, regions of the rollers of the driven roller assembly being rotatably secured to the first support member. An idler roller assembly has at least two axially aligned rollers extending between the opposed ends of the frame, regions of the rollers of the idler roller assembly being rotatably secured to the second support member. The driven roller assembly and the idler roller assembly are configured and positioned to move the structure for delivering a crop to the header.

The present invention further relates to a crop gathering device for use with a harvesting header including a frame carrying a belt about an endless path to deliver a crop to the header, the frame having opposed ends and connected to the header. The frame includes a first support member and a second support member, each support member extending unsupported between the opposed ends of the frame. A driven roller assembly having at least two axially aligned rollers extends between the opposed ends of the frame, regions of the rollers of the driven roller assembly being rotatably secured to the first support member. An idler roller assembly has at least two axially aligned rollers extending between the opposed ends of the frame, regions of the rollers of the idler roller assembly being rotatably secured to the second support member. The driven roller assembly and the idler roller assembly are configured and positioned to move the structure for delivering a crop to the header. The driven roller assembly and the idler roller assembly are configured and positioned to maintain substantially equal forces along regions of contact with the belt.

An advantage of the present invention is more uniform friction (traction) across the width of the belt(s) of the crop gathering device.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
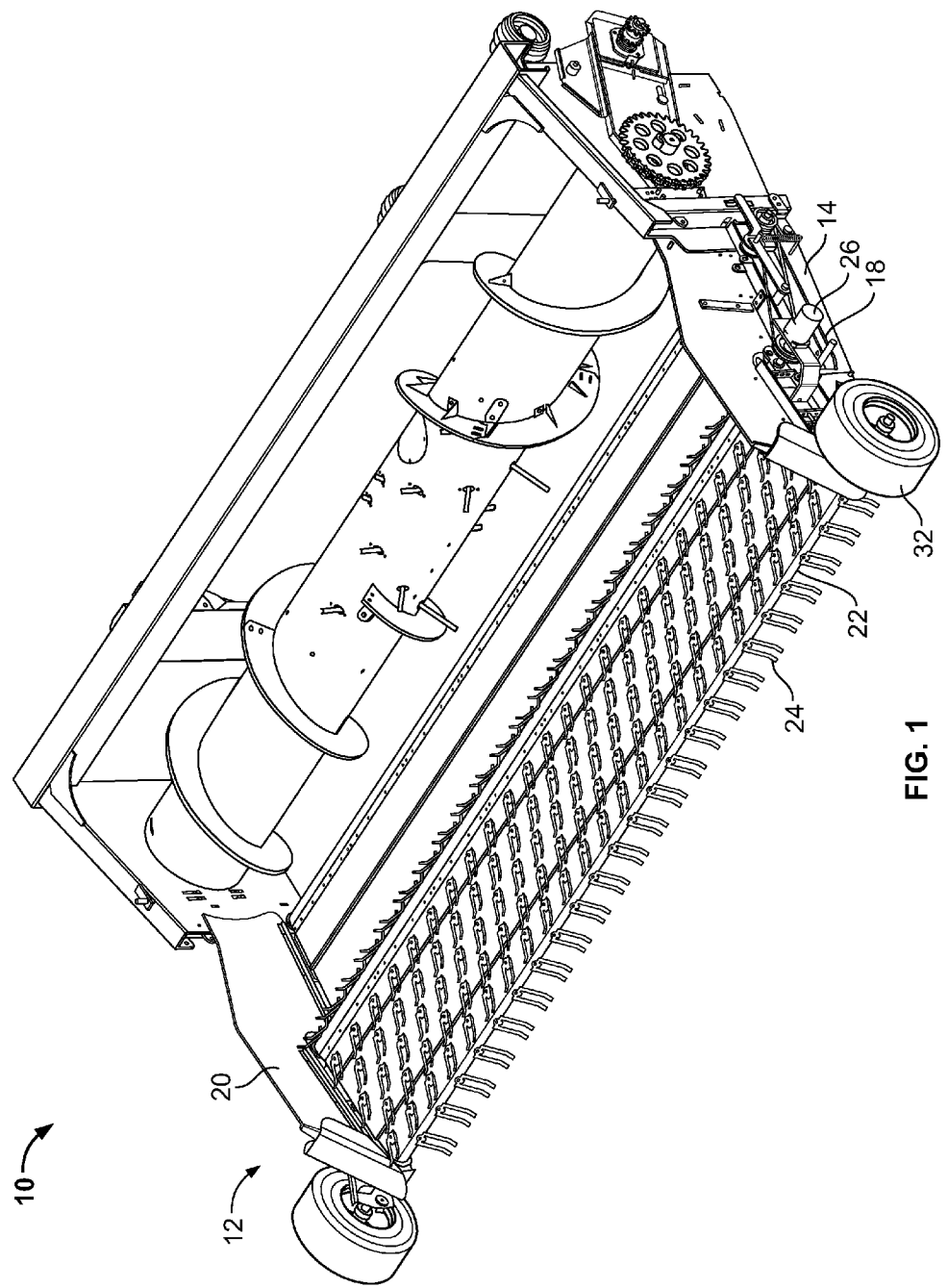
FIG. 1 is a top perspective view of an embodiment of a crop gathering device and harvesting header of the present invention.

FIGS. 1-4 show a crop gathering device 12 for use with a harvesting header 10. Harvesting header 10 may be secured to an agricultural vehicle such as a combine (not shown) as is known in the art and not further discussed. A frame 14 carries a structure 22 movable about an endless path to deliver a crop to harvesting header 10. In one embodiment, structure 22 is a belt, or multiple belts, that extends from one end 18 of frame 14 toward another end 20 of frame 14. Structure 22 may include a plurality of tines 24 or fork-like components extending outwardly from the structure to assist with collecting crops arranged in a windrow. Wheels 32 are rotatably secured to or near respective ends 18, 20 of frame 14 to maintain one end of structure 22 near the ground to permit tines 24 of structure 22 to gather or collect crops arranged in the windrow.

Figure 2:
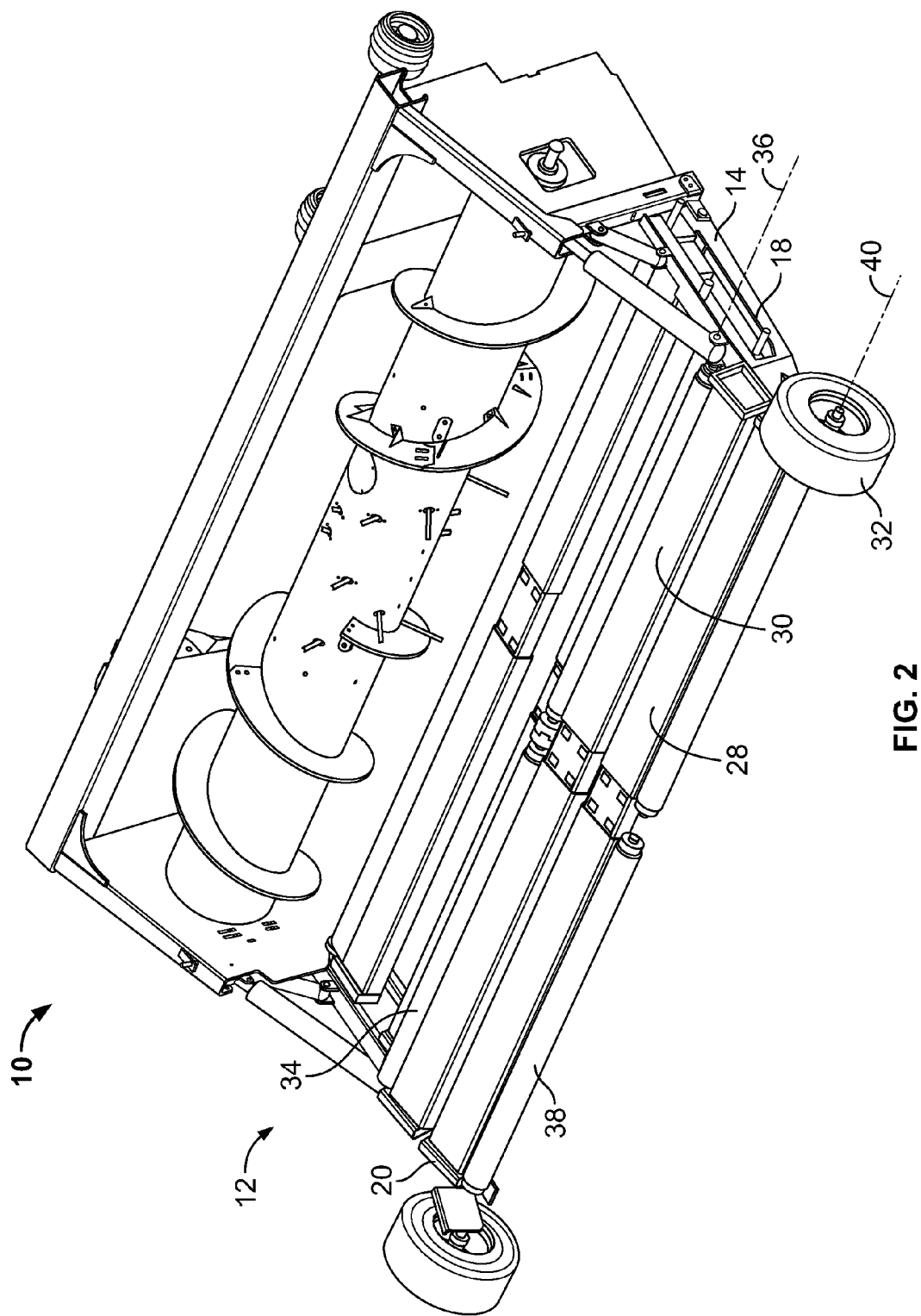
FIG. 2 is a view of the crop gathering device of FIG. 1 (the crop conveying belt not shown) of the present invention.
Figure 3:
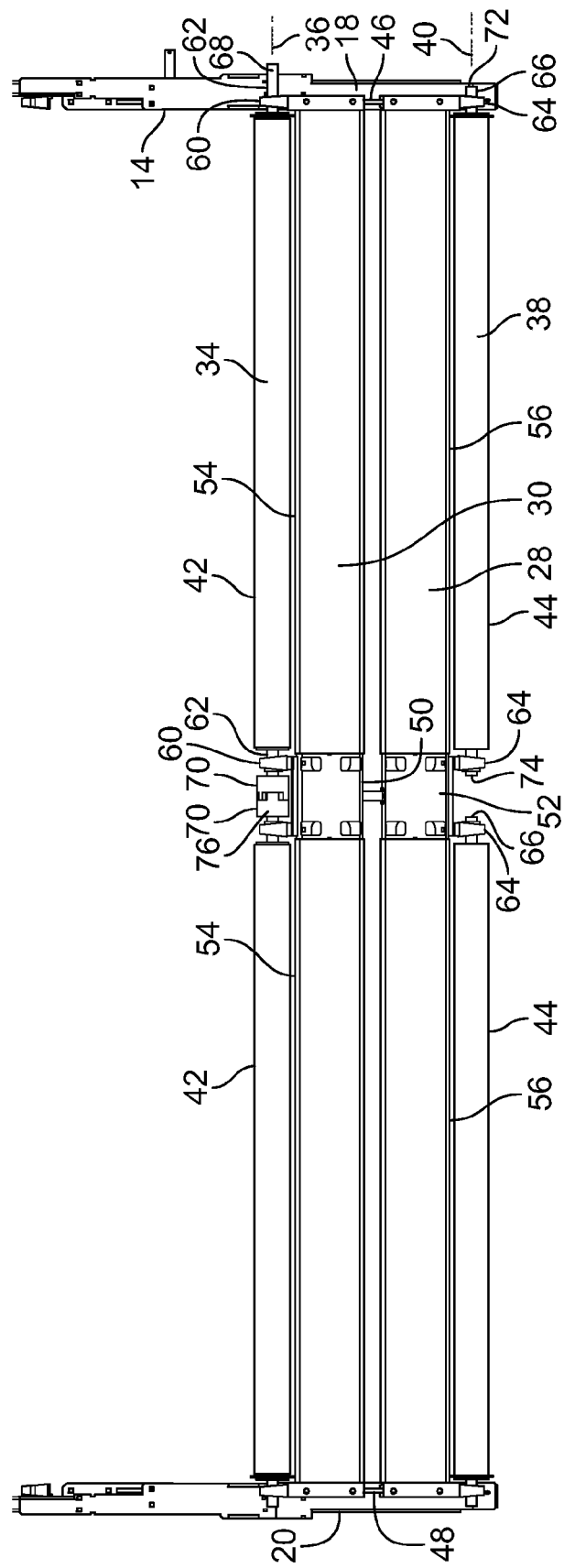
FIG. 3 is a plan view of an embodiment of the crop gathering device (the crop conveying belt not shown) of the present invention.
Figure 4:
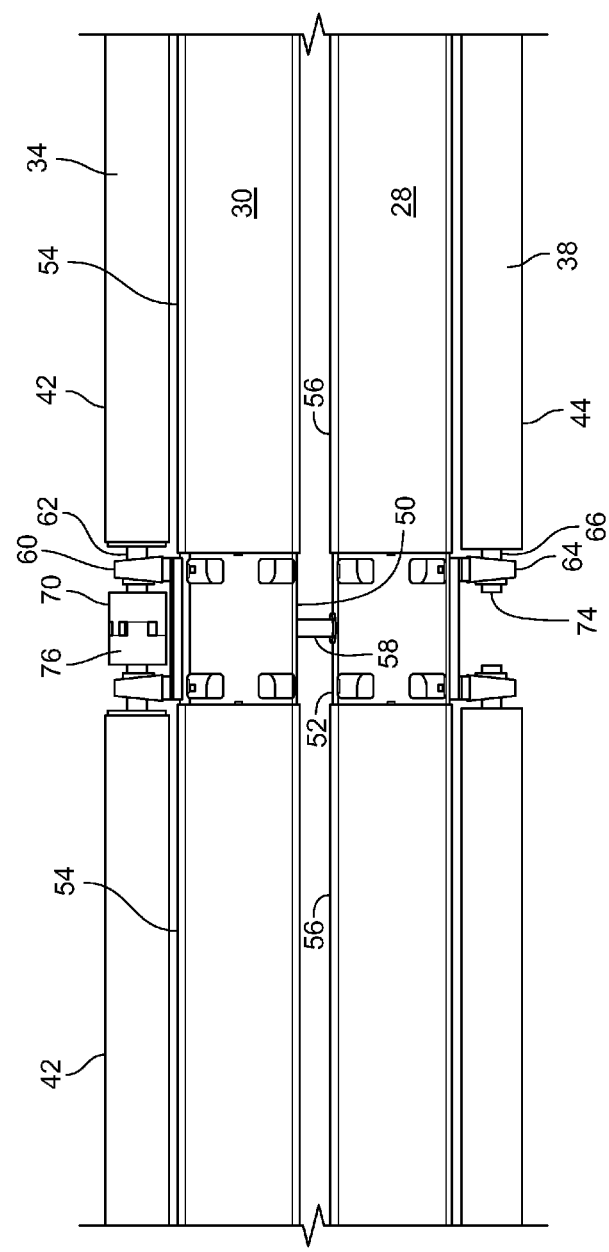
FIG. 4 is an enlarged, partial plan view of the crop gathering device of FIG. 3 of the present invention.

As shown in FIGS. 2-4 (structure 22 is removed for clarity), support member 28 extends between respective ends 18, 20 of frame 14. In one embodiment, support member 28 extends unsupported between respective ends 18, 20 of frame 14. Support member 28 includes a pair of segments 56 that are in substantial axial alignment with each other. An insert member 52 may be positioned between the ends of segments 56 of support member 28. In an alternate embodiment, support member 28 may be of unitary construction, that is, support member 28 may be of one-piece construction. Support member 28 may be composed of a tube structure, C-channel or other construction, so long as the support member has sufficient structural rigidity to substantially prevent deflection in response to loading conditions described below.

An idler roller assembly 38 includes at least two axially aligned rollers 44 extending along a rotation axis 40 between respective opposed ends 18, 20 of frame 14. Support member 28 includes fittings 64 interfacing with corresponding regions 66 of rollers 44 which rotatably secure and structurally support the rollers. As shown in FIG. 3, region 66, which corresponds to an end 72 of roller 44, is rotatably secured to fitting 64 at end 18 of frame 14. Another region 66, which corresponds to an end 74 that is opposite of end 72 of roller 44, is rotatably secured to fitting 64 at approximately mid-span of support member 28. The other roller 44 that substantially spans the remaining portion of support member 28 is similarly rotatably secured to fittings 64. Fittings 64 include axially aligned openings to receive facing ends of rollers 44.

It is to be understood that regions 62, 66 of rollers 42, 44 of roller assemblies 34, 38 that interface with fittings 60, 64 for rotatably securing the roller assemblies are not limited to the ends of the rollers, but may correspond to portions of the rollers that are not located near the ends of the rollers, nor are the fittings limited to be positioned near the ends of the rollers nor near the mid-spans of the roller assemblies.

As further shown in FIGS. 2-4, support member 30 extends between respective ends 18, 20 of frame 14. In one embodiment, support member 30 extends unsupported between respective ends 18, 20 of frame 14. Support member 30 includes a pair of segments 54 that are in substantial axial alignment with each other. An insert member 50 may be positioned between the ends of segments 54 of support member 30. In an alternate embodiment, support member 30 may be of unitary construction, that is, support member 30 may be of one-piece construction. Support member 30 may be composed of a tube structure, a plate, C-channel, angle or other open or closed profile construction, so long as the support member has sufficient structural rigidity to substantially prevent deflection in response to loading conditions described below.

A driven roller assembly 34 includes at least two axially aligned rollers 42 extending along a rotation axis 36 between respective opposed ends 18, 20 of frame 14. Support member 30 includes fittings 60 interfacing with corresponding regions 62 of rollers 42 which rotatably secure and structurally support the rollers. As shown in FIG. 3, region 62, which corresponds to an end 68 of roller 42, is rotatably secured to fitting 60 at end 18 of frame 14. Another region 62, which corresponds to an end 70 that is opposite of end 68 of roller 42, is rotatably secured to fitting 60 at approximately mid-span of support member 30. The other roller 42 that substantially spans the remaining portion of support member 30 is similarly rotatably secured to fittings 60. When configured for operation, facing ends 70 of aligned rollers 42 can be interconnected, collectively forming a coupled joint, so that a single drive unit, such as hydraulic motor 26 (FIG. 1) rotatably drives driven roller assembly 34. Fittings 60 include axially aligned openings to receive facing ends of rollers 42.

Structure 22, which can be a belt, surrounds support members 28, 30 and is rotatably driven by virtue of frictional force applied to the inside surface of structure 22 by a driven roller assembly 34 and an idler roller assembly 38. Support members 28, 30 are maintained substantially parallel to each other. However, distance adjustment device 46 can adjust the distance between ends of support members 28, 30 secured to end 18 of frame 14 as required for proper tracking of structure 22 between ends 18, 20 of frame 14. In one embodiment, the ends of support member 30 can be fixed to respective ends 18, 20 of frame 14. In another embodiment, the ends of support member 28 can be fixed to respective ends 18, 20 of frame 14. An optional guide 58 can be secured to one support member and extend inside the other support member to provide tracking between support members at mid-span or other positions along the support members. That is, as shown in FIG. 4, guide 58 is secured to insert member 52 of support member 28 with the opposite end of guide 58 extending inside of insert member 50 of support member 30.

It is to be understood that structure 22 may be of unitary construction, although in another embodiment structure 22 can be constructed of multiple segments arranged side-by-side over the collective length of support members 28, 30. By virtue of the structural rigidity of support members 28, 30, and without additional support of the support members other than opposed ends 18, 20 of frame 14, support members 28, 30 will essentially not deflect in the plane defined by roller axes 36, 40. Stated another way, rigid support members 28, 30 will permit substantially uniform adjustment and frictional forces (traction) along substantially the entire width of structure 22, while permitting adjustment between the ends of the support members to additionally permit "tracking" or controlled positioning of structure 22 with respect to opposed ends 18, 20 of frame 14. Stated another way, driven roller assembly 34 and idler roller assembly 38 are configured and positioned to maintain substantially equal forces along regions of contact with the roller assemblies. In one embodiment, such controlled positioning of structure 22 may be performed remotely during operation of crop gathering device 12 by an operator, or automatically by sensing devices (not shown).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A crop gathering device for use with a harvesting header comprising:
    a frame carrying a structure movable about an endless path to deliver a crop to the header, the frame having opposed ends and connected to the header;
    the frame comprising:
    a first support member and a second support member, each support member extending between the opposed ends of the frame and the first and second support members are disposed longitudinally adjacent to each other;
    a driven roller assembly extending between the opposed ends of the frame; and
    an idler roller assembly extending between the opposed ends of the frame, wherein the first and second support members are disposed in between the driven roller assembly and the idler roller assembly, such that the first support member is longitudinally adjacent the driven roller assembly and the second support member is longitudinally adjacent the idler roller assembly; and
    wherein the driven roller assembly and the idler roller assembly are configured and positioned to move the structure for delivering a crop to the header.

2. The device of claim 1, wherein the structure is a belt.

3. The device of claim 2, wherein the belt includes tines extending outwardly from the belt.

4. The device of claim 1, wherein a distance between ends of the first support member and a second support member is selectively adjustable.

5. The device of claim 1, wherein the first support member and the second support member are positioned substantially parallel to each other.

6. The device of claim 1, wherein a guide positioned between ends of the first support member and the second support member is secured to the first support member and extends into the second support number.

7. The device of claim 1, wherein the at least two axially aligned rollers of the driven roller assembly are interconnected during operation of the device.

8. The device of claim 1, wherein at least one of the first support member and the second support member is of unitary construction.

9. The device of claim 1, wherein the first support member and the second support member each include segments that are assembled together.

10. The device of claim 1, wherein an insert member is positioned between facing ends of the support members which are assembled together.

11. The device of claim 1, wherein at least one of the first support member and the second support member is a C-channel.

12. The device of claim 1, wherein at least one of the first support member and the second support member is a tube.

13. The device of claim 1, wherein fittings having axially aligned openings receive facing ends of the rollers of the roller assemblies.

14. The device of claim 1, wherein the first and second support members have fittings at approximately midspan of each respective support member, the driven roller assembly having at least two axially aligned rollers extending between the opposed ends of the frame, wherein one end of each roller of the driven roller assembly is rotatably secured to the fitting of the first support member, and the idler roller assembly having at least two axially aligned rollers extending between the opposed ends of the frame, wherein one end of each roller of the idler roller assembly is rotatably secured to the fitting of the second support member.

15. A crop gathering device for use with a harvesting header comprising:

a frame carrying a belt about an endless path to deliver a crop to the header, the frame having opposed ends and connected to the header;

the frame comprising:

a first support member and a second support member, each support member extending between the opposed ends of the frame and the first and second support members are disposed longitudinally adjacent to each other;

a driven roller assembly extending between the opposed ends of the frame; and an idler roller assembly extending between the opposed ends of the frame, wherein the first and second support members are disposed in between the driven roller assembly and the idler roller assembly, such that the first support member is longitudinally adjacent the driven roller assembly and the second support member is longitudinally adjacent the idler roller assembly; and wherein the driven roller assembly and the idler roller assembly are configured and positioned to move the structure for delivering a crop to the header;

wherein the driven roller assembly and the idler roller assembly are configured and positioned to maintain substantially equal forces along regions of contact with the belt.

16. The device of claim 15, wherein a distance between ends of the first support member and a second support member is selectively adjustable.

17. The device of claim 15, wherein the at least two axially aligned rollers of the driven roller assembly are interconnected during operation of the device.

18. The device of claim 15, wherein at least one of the first support member and the second support member is of unitary construction.

19. The device of claim 15, wherein an insert member is positioned between facing ends of the support members which are assembled together.

20. The device of claim 15, wherein a guide is coupled to one support member and extends inside the another support member to provide tracking between the first and second support members.

21. The device of claim 20, wherein the guide is coupled to the first and second support members at midspan thereto.

* * * * *